May 4, 1926.
A. PRINCE
COLLAPSIBLE TIRE RIM
Filed May 22, 1924
1,583,174
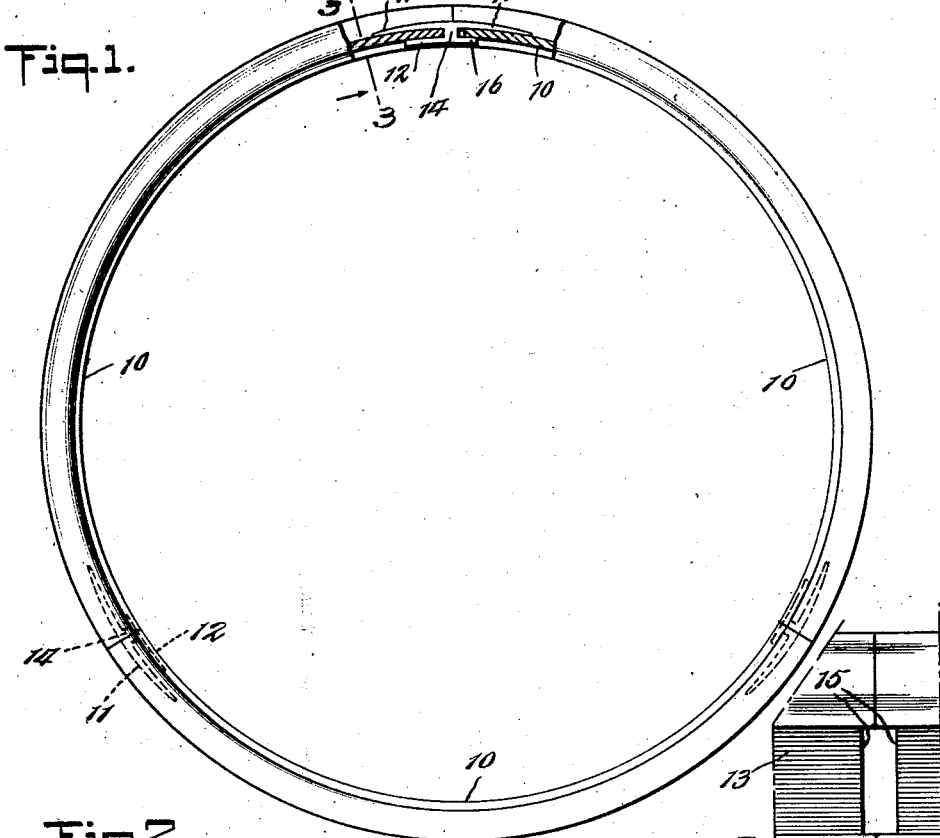
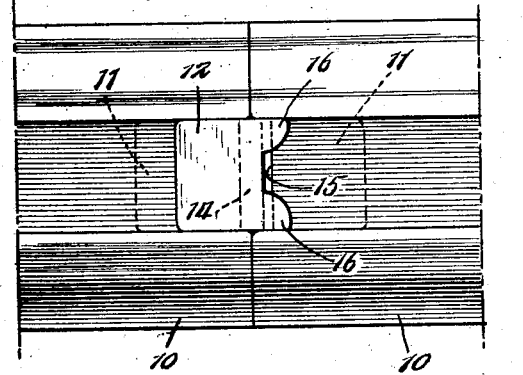
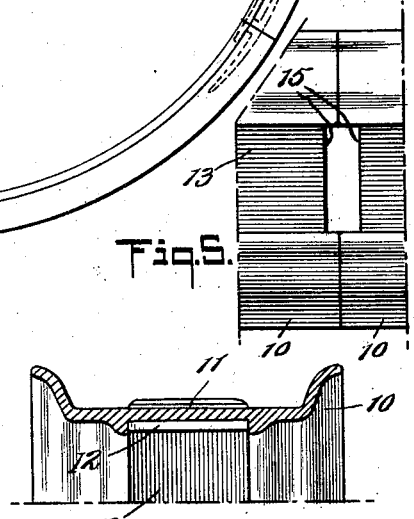
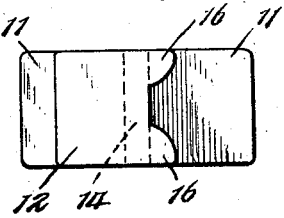
INVENTOR.
Aladar Prince
BY
ATTORNEYS.

Patented May 4, 1926.

1,583,174

UNITED STATES PATENT OFFICE.

ALADAR PRINCE, OF NEW YORK, N. Y., ASSIGNOR TO LEON T. DOUR, EMIL J. DOUR, FREDERICK J. DOUR, AND ALADAR PRINCE, DOING BUSINESS AS PRINCE AND DOUR BROS., OF NEW YORK, N. Y.

COLLAPSIBLE TIRE RIM.

Application filed May 22, 1924. Serial No. 715,037.

*To all whom it may concern:*

Be it known that I, ALADAR PRINCE, a citizen of Austria, and a resident of New York city, in the county and State of New York, have invented certain new and useful Improvements in Collapsible Tire Rims, of which the following is a specification.

Among the principal objects which the present invention has in view are: to facilitate the insertion and removal of metal rims from automobile tires associated therewith; to facilitate the transportation of such rims; and to simplify and cheapen the construction.

Drawings.

Figure 1 is a side view of a tire rim constructed and arranged in according with the present invention, a portion of the rim being cut away to show the construction of the ends of the rim sections and means for joining same.

Figure 2 is a detailed view on enlarged scale, showing end fragments of rim sections and the clip for joining same in service.

Figure 3 is a cross section of a tire rim, the section being taken as on the line 3—3 in Figure 1, the ends of the joining clips being shown therein.

Figure 4 is a detailed view of the joining clip.

Figure 5 is a view showing end fragments of a tire rim, the joining clip being omitted therefrom.

Description.

As seen in the drawings I prefer to construct a tire rim in three rim sections 10. The sections 10 are connected in service by clips such as shown in detail in Figure 4 of the drawings. The clips in question have each a top plate 11 and a bottom plate 12.

The plates 11 and 12 are spaced apart the thickness of the median section 13 of the rim sections, it being designed that the fit between the rim sections and the clip shall be snug, or even if necessary a drive fit, thus preventing rattling or creaking. The plates 11 and 12 are united by a shank portion 14. To receive the shank portion 14 the ends of the rim sections are cut away to form the recesses 15. The walls of the recesses 15 are spaced apart a distance slightly greater than the thickness of the shank 14, as can be seen in Figure 1 and Figure 2 of the drawings. A space is thus left between the side wall of the shank portion 14 and of the adjacent rim section wherein a tire tool or screwdriver may be inserted for the purpose of prying the sections 10 apart when it is desired to assemble or break down the rim formation.

As seen best in Figures 2 and 4 of the drawings, the plate 12 has forward extensions 11 which in service overhang the adjacent rim section. The extensions 16 are spaced apart to form an opening to provide a passageway for the tire tool or screwdriver as above mentioned.

When provided with a tire rim constructed and arranged as shown in the drawings the completed rim is assembled by placing in the tire the various sections 10. All but one of the clips can be fully seated on their adjacent rim sections. What may be termed the final join will be out of line due to the fact that the extensions 16 stand in the way of the proper alinement of the last to be joined rim sections. It is now that a tire tool, screwdriver or other suitable implement is placed between the edge of the recesses 15 and the side wall of the clip which has previously been installed in the rim section previously set. By means of the implement referred to the rim sections are pressed apart until the edge of the recess 15 can pass the extensions 16. When this is accomplished the rim section being adjusted can be released to slide between the extensions 16 and the top plate 11.

The rim being thus completed the tire may be inflated, the pressure of which applied externally on the said sections seat them firmly in service position, the clips serving to retain them rigidly.

Claims.

1. A tire rim comprising a plurality of rim sections, the ends whereof are cut away to form recesses; and a plurality of clips for holding said sections, each of said clips having a shank fitting said recesses and provided with plates adapted to overlap the ends of said sections adjacent said recesses for retaining said sections in service relation.

2. In a tire rim, a clip having a shank and retaining plates at the opposite sides thereof, said plates being spaced apart the thickness of the metal forming the median portion of said rim, the inner plate having laterally disposed extensions to form a passageway for introducing a prying implement between said shank and the end of the adjacent rim section.

ALADAR PRINCE.